No. 787,904. PATENTED APR. 25, 1905.
J. DRING.
MECHANISM FOR THE TRANSMISSION OF POWER OR MOTION.
APPLICATION FILED JUNE 16, 1902.
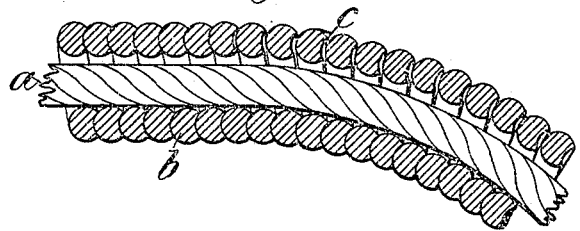
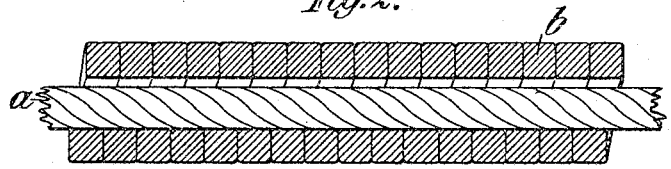
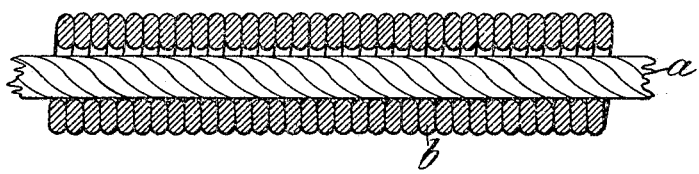

No. 787,904. Patented April 25, 1905.

UNITED STATES PATENT OFFICE.

JOHN DRING, OF LONDON, ENGLAND.

MECHANISM FOR THE TRANSMISSION OF POWER OR MOTION.

SPECIFICATION forming part of Letters Patent No. 787,904, dated April 25, 1905.

Application filed June 16, 1902. Serial No. 111,923.

*To all whom it may concern:*

Be it known that I, JOHN DRING, a subject of His Majesty the King of Great Britain, residing at London, in the county of Middlesex, England, have invented new and useful Improvements Relating to Mechanism for the Transmission of Power or Motion, of which the following is a specification.

My present invention relates to the manufacture of mechanism for the transmission of power or motion, such as described in Bowden's United States Patent No. 609,570. The transmitting mechanism as described in that patent consists of an inner or inextensible member within an outer or incompressible member, constructed by coiling a wire circular in transverse section into a closely-wound helix, each turn of wire abutting the next one; but with wire circular in transverse section it will be apparent that the turns of wire only touch each other at one point of their circumference, and when the said mechanism is bent to a curve there is a tendency for the helices of the incompressible member to mount or ride upon each other.

My present invention has for its object to produce a stronger, better, and more closely wound incompressible member, and thereby an improved mechanism of the character alluded to.

According to my invention I employ wire of D, crescent, or U section or of some transverse section other than circular—such as square, angular, or oblong section—so that when the said wire is turned into a helix the flat or concave side of the one turn abuts onto or interlocks with the flat or convex side of the adjacent turn.

In the accompanying drawings, Figure 1 shows in longitudinal section a length of mechanism slightly bent or curved, the incompressible member being of D, U, or crescent section. Fig. 2 shows a length of mechanism with the incompressible member of approximately square or rectangular section, and Fig. 3 is a similar view with an incompressible member of oblong or oval section.

In all the figures, $a$ is the inextensible member, and $b$ is the incompressible member. As will be understood, the inextensible member $a$ is flexible and is adapted to pass freely through the incompressible member $b$ and to move longitudinally therein. As will be seen in Fig. 1, the incompressible member $b$ is formed of D, U, or cresent section, so that a concavity $c$ is formed in each turn of wire. When the mechanism is in a straight length, the convexity of each turn lies within the concavity $c$ of the adjacent turn. When the length is bent or curved, the inner parts of the coil turn or "knuckle" in each other and those on the periphery of the curve open somewhat, as shown; but it will be seen that each turn may be separated from its neighbor before a direct opening or gaping occurs.

As will be seen in Fig. 2, the incompressible member $b$ is formed of approximately square or rectangular section, each flat side abutting closely against the next turn of wire. The corners need not be strictly right angles, but may be cut or rounded off.

Fig. 3 shows the incompressible member $b$ of oblong section, with the internal and external sides slightly rounded or curved, thus making the whole wire more or less oval in transverse section.

It will be noticed that the two members $a$ and $b$ are to be arranged and operated in precisely the same manner as in the Bowden patent referred to, the ends of the incompressible member being held between fixed abutments and the inextensible member being connected at one end to a brake or other part to be operated, while the opposite end is connected with a lever or other operating device.

What I claim, and desire to secure by Letters Patent of the United States, is—

1. Mechanism for the transmission of power or motion in a longitudinal or axial direction comprising a closely-wound helix of wire of transverse section other than circular constituting an incompressible member and a flexible inextensible member passing freely through said incompressible member and movable longitudinally therein.

2. Mechanism for the transmission of power or motion in a longitudinal or axial direction comprising an incompressible member and a flexible endwise-movable inextensible member passing freely therethrough, said incompressible member consisting of a closely-wound helix of wire of transverse section other than circular.

3. Mechanism for the transmission of power or motion in a longitudinal or axial direction comprising a closely-wound helix of wire of concaved crescent section constituting the incompressible member and a flexible inextensible member passing freely through said incompressible member.

In testimony whereof I have hereunto subscribed my name.

JOHN DRING.

Witnesses:
  A. F. HOOVER,
  J. S. WITHERS.